(No Model.)
5 Sheets—Sheet 3.

P. O'CONNOR.
SHINGLE SAWING MACHINE.

No. 358,474. Patented Mar. 1, 1887.

ATTEST.
B. F. Wheeler
C. W. Russell.

INVENTOR.
Patrick O'Connor
By Roscoe B.␣␣␣␣␣
atty (No Model.)  5 Sheets—Sheet 4.
P. O'CONNOR.
SHINGLE SAWING MACHINE.
No. 358,474.  Patented Mar. 1, 1887.
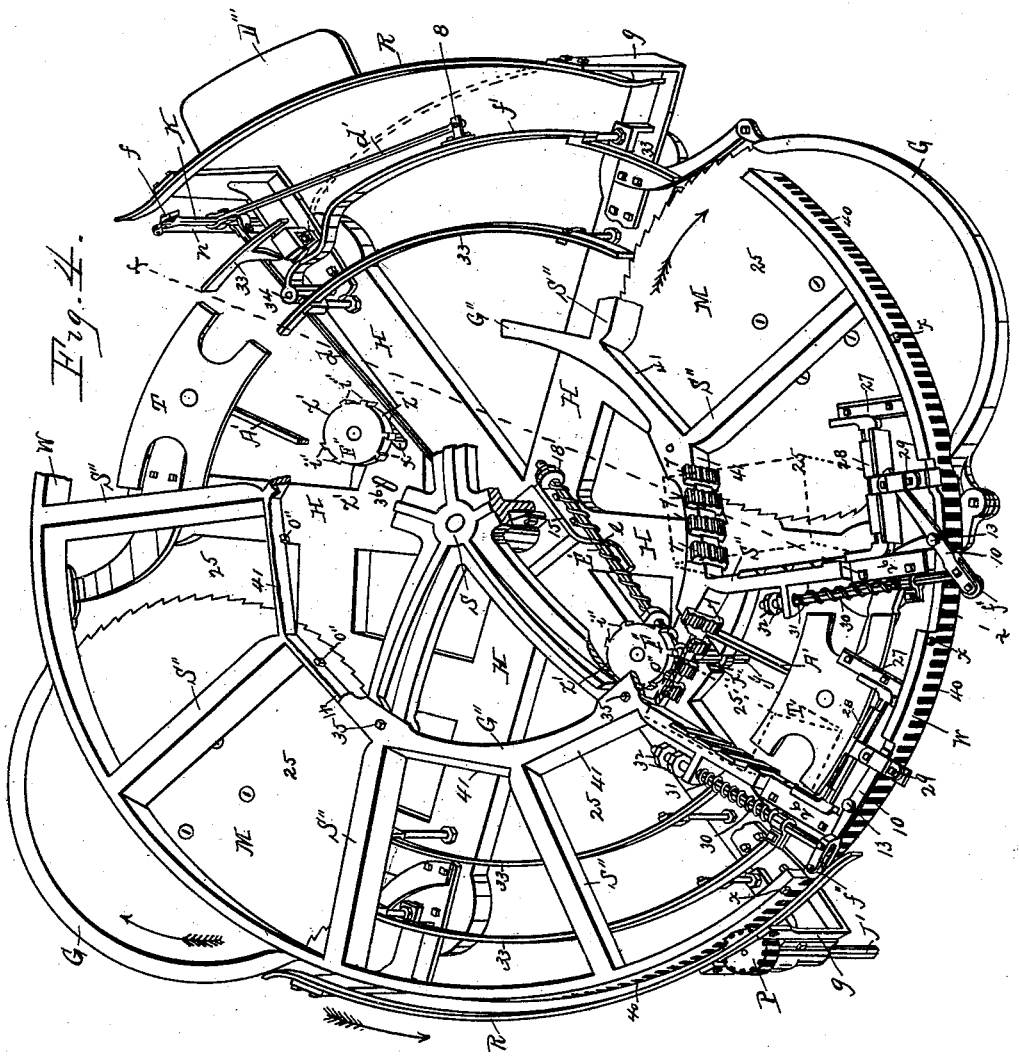
ATTEST.  INVENTOR.

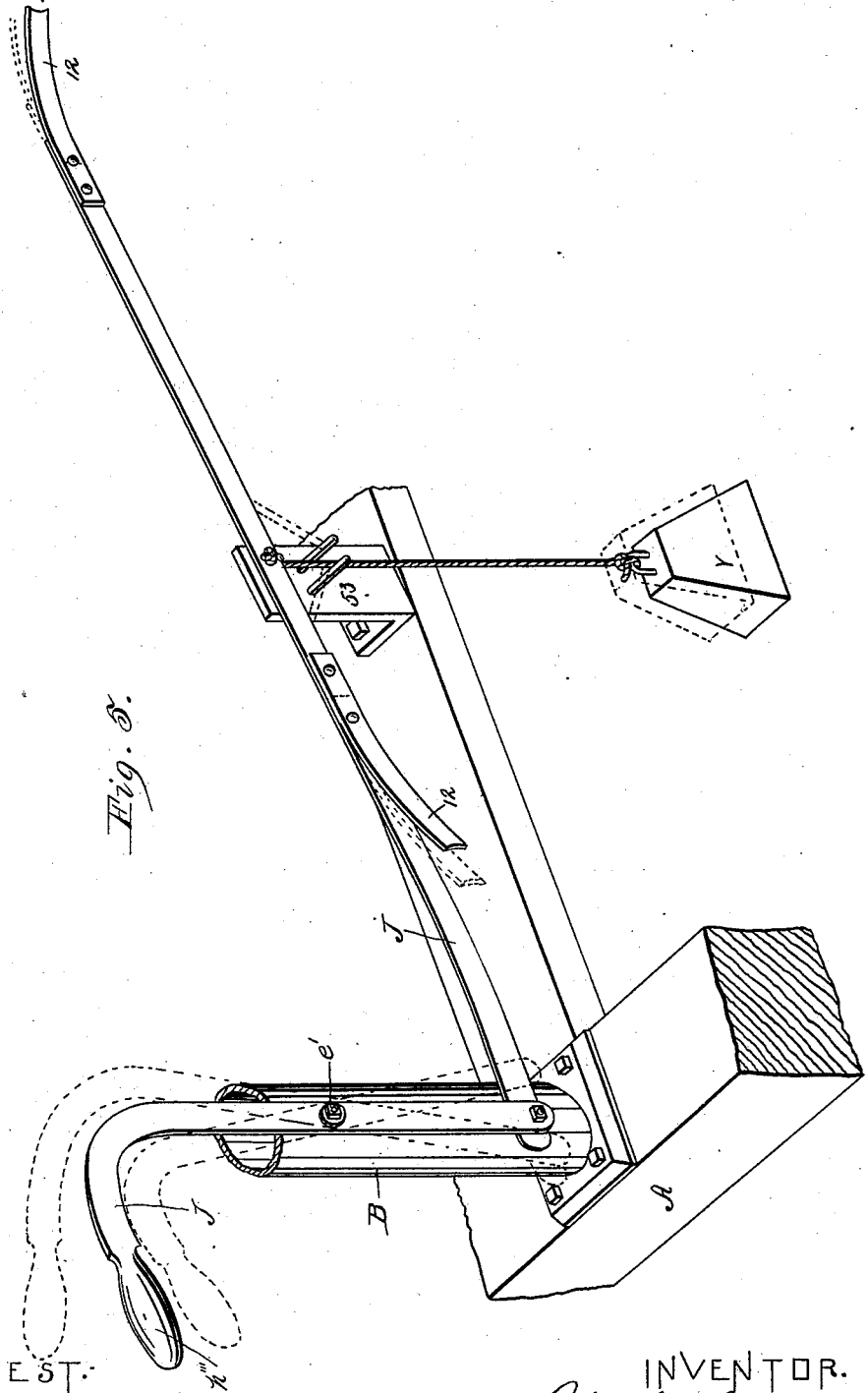

UNITED STATES PATENT OFFICE.

PATRICK O'CONNOR, OF LUDINGTON, MICHIGAN.

SHINGLE-SAWING MACHINE.

SPECIFICATION forming part of Letters Patent No. 358,474, dated March 1, 1887.

Application filed August 11, 1886. Serial No. 210,613. (No model.)

*To all whom it may concern:*

Be it known that I, PATRICK O'CONNOR, a citizen of the United States, residing at Ludington, in the county of Mason and State of Michigan, have invented certain new and useful Improvements in Shingle-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention in shingle-machines relates more especially to that class known as "rotary" machines, wherein two or more circular saws may be employed. The blocks from which the shingles are to be cut are presented to the saws by means of a rotating table or carriage, and my present invention is designed as an improvement upon Letters Patent No. 292,347, issued to me on January 22, 1884; and my invention consists in the means employed for driving the revolving table, the device for holding the shingle-blocks within said table, the mechanism for clamping and releasing the shingle-blocks, the tilting tables or platforms located in advance of the saws and mechanism for tilting or adjusting said tables, and mechanism for automatically bringing said tables back to their normal position, the device for dropping or discharging from the machine while in motion the refuse or waste portion of said shingle-blocks, and in certain details of construction, as hereinafter fully set forth, and pointed out particularly in the claims.

Figure 1:
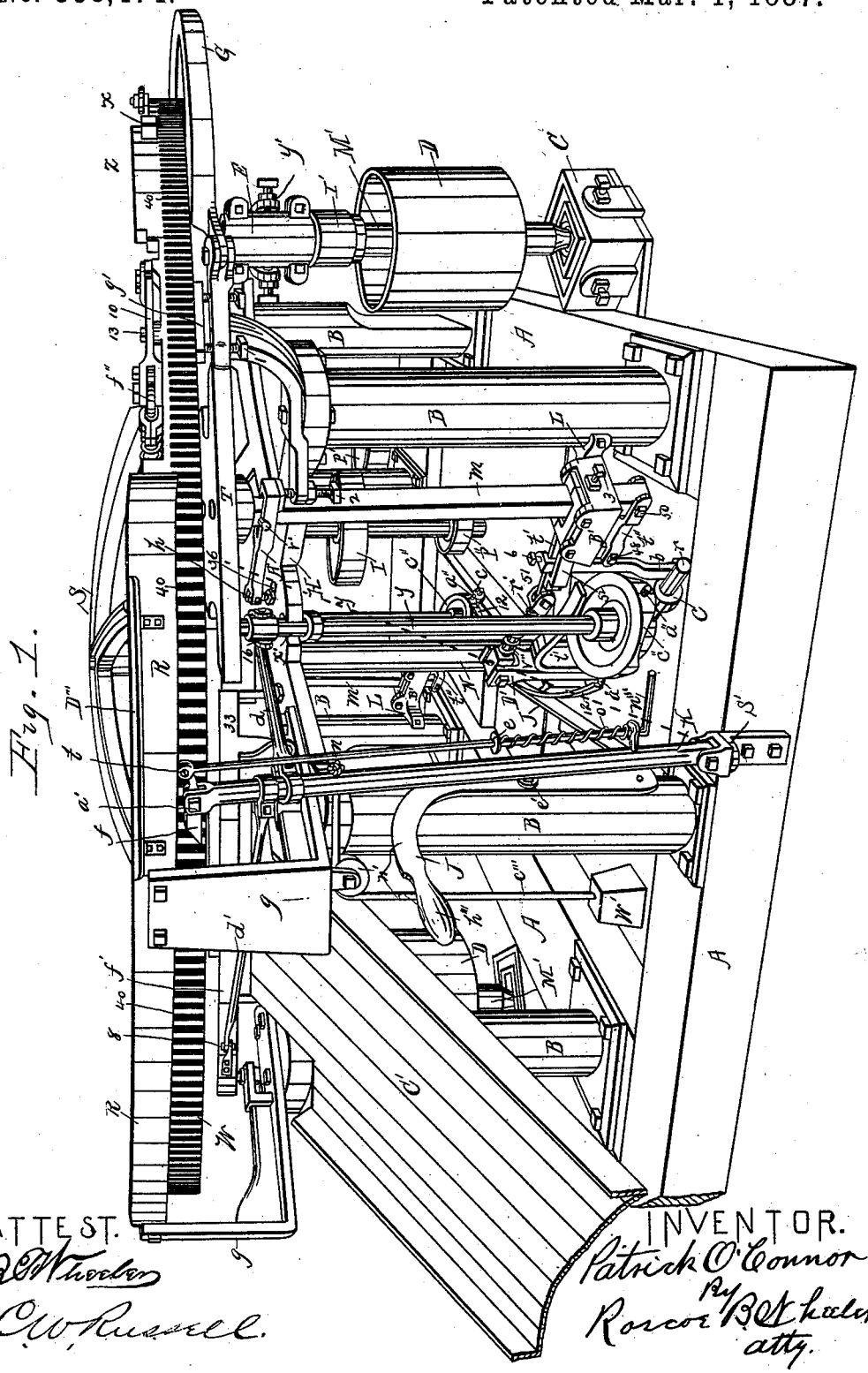
Figure 2:
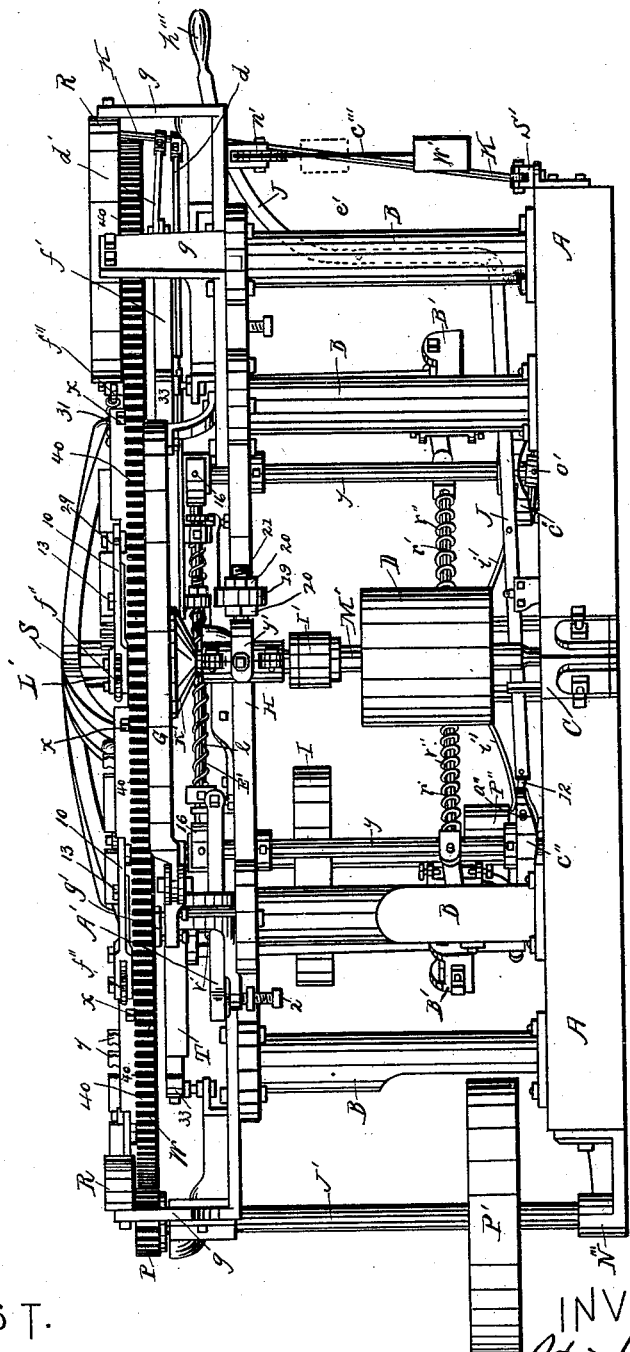
Figure 3:
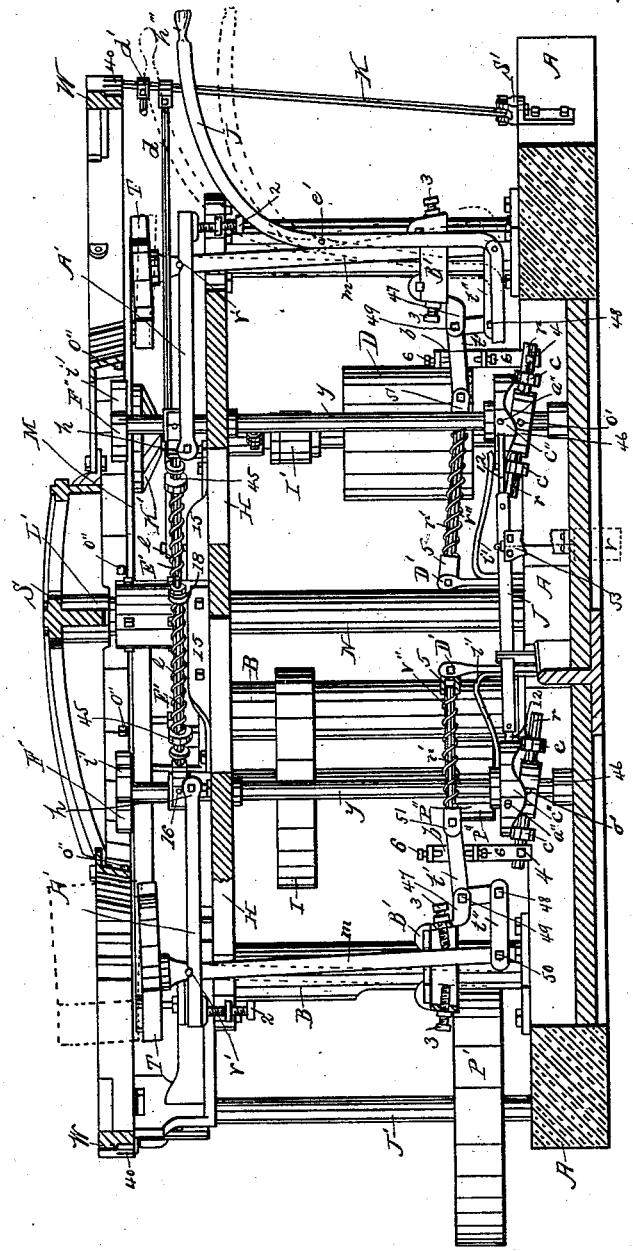

In the drawings, forming a part of this specification, Figure 1 is a perspective of my invention from the operating end of the machine. Fig. 2 is a side elevation of same, showing operating end at the right. Fig. 3 is a longitudinal section in elevation on dotted line $xx$ of Fig. 4. Fig. 4 is a top perspective having some of like parts broken away. Fig. 5 is an enlarged detail of the hand-setting mechanism.

The invention is shown in four sheets of drawings.

In the drawings, A represents the base or foundation frame; B, the pillars or uprights mounted on said base. H is a horizontal stationary frame, which is mounted upon the upper ends of the uprights B. Said frame consists of a series of arms extending outward from a common center, their free ends being supported upon the uprights, as shown in Figs. 1, 2, and 4.

Passing vertically through the center of the frame H is a shaft, N, its lower end being provided with a suitable bearing upon which it revolves. On the upper end of said shaft I mount the spider S, having the head L', which is firmly secured to the shaft. The arc-shaped arms of the spider at the free ends is bolted to the annular frame W at 35. The annular frame consists of two concentric rings having transverse bars S'', joining said rings and forming a series of pockets or shingle-block receptacles, 25, between said bars. The right-hand faces of the bars S'' and the outer faces of the ring G'' at 41 are at right angles to each other, thus forming supports for the side and end of a shingle-block when dropped into said pockets, also presenting the blocks squarely to the saws as the annular frame is revolved upon the shaft N. The outer periphery of the ring W of the annular frame is provided with a series of cogs, 40.

J' is a vertical shaft. Its lower end is supported by the step N''', which is attached to the frame A. (See Fig. 2.) P' is a pulley for driving said shaft, and P is a pinion mounted on the upper end of the shaft, its cogs meshing with the cogs 40 of the annular table or carriage, whereby said carriage is revolved.

On each side of the machine I locate a mandrel, M', having an adjustable bearing, C, at the lower end. On said mandrel I locate the pulleys D I'. The pulleys D are the drive-pulleys, each being driven by an independent belt from the engine or driving-power.

E E are boxes supporting the upper ends of the mandrels. Said boxes are attached to the yokes Y'. Made fast to each yoke is a screw-threaded bolt, 21, which passes through a fixed ear, 19, having nuts 20, located on each side of said ears, (see Fig. 2,) and by adjusting said nuts the upper ends of the mandrels may be properly adujsted. To the upper ends of the mandrels I firmly secure a collar, K'. To said collar the saws M are attached and revolve horizontally, both saws traveling in the same direction, as indicated by arrows in Fig. 4. The annular table W at the same time is caused to revolve over the saws in an opposite direction, as also indicated by the arrow in Fig. 4.

I and P″ are pulleys mounted upon a vertical and intermediate shaft, and by belting from pulley I′ to pulley I and from pulley P″ to pulley P′ the desired power and speed is obtained for revolving the pinion P, whereby the annular carriage W G‴ is driven.

G G are guards encircling the saws, which are firmly bolted to an arm attached to the stationary frame H, and g are elbow-arms attached to the outer ends of the frame H. To the upper ends of said arms I secure the circular tracks R R, whose curvature is made to coincide with that of the annular frame W, for the purposes hereinafter fully set forth.

T T represent tilting tables, which I locate on opposite sides of the machine, each table being in advance of a saw, M. (See Figs. 3 and 4.) From the rear of each saw to the tables I locate the stationary circular tracks 31. The upper edges of said tracks are slightly below the horizontal face of the saws, while the tables T are to be a shingle's thickness below the saws.

Each of the compartments 25 of the annular frame are provided with a sliding head, 28, its ends working on slides 26 and 27. Said heads have also a central arm, 29, working in a slideway, so as to cause each head to move squarely forward and back and not bind in its movements. I attach freely to the arm 29 of each head one end of a lever, 10, each lever being pivotally attached to the periphery of the annular table at 13. (See Figs. 1 and 4.) The free end of each lever is provided with a friction wheel or bearing, f′, and near the free end of each lever I pivot a horizontally-projecting rod, 30, which has end movement through suitable supports upon the transverse bars S″, and 31 is a coiled wire encircling said rod, the free end of the rod being provided with nuts 32, to regulate the outward movement of the rod by the action of the spring 31.

It will be observed that the sliding heads 28 and operating parts are mounted on the traveling annular frame, hence are carried around as the frame revolves, and when revolving the friction-wheels f″ are brought in contact with the circular tracks or rails R R, when the free or outer ends of the levers are forced inward, drawing back the sliding heads 28, as clearly shown at the left of Fig. 4, and when the friction-wheels leave the track or tracks R R the springs 31 force the rods 30 outward, thus throwing the sliding heads 28 inward, or toward the center of the machine, as clearly shown at the right of Fig. 4. By this arrangement the shingle-blocks, when placed in the compartments 25, are grasped and released automatically by the action of the sliding heads 28.

The circular tracks R R, I locate at the rear of each saw, so that the shingle-blocks as soon as they have passed over the saws will be released by the sliding or clamping heads 28 and will be carried around to the next table, T, on the circular tracks 33, when the block or blocks will be again grasped by the sliding head or heads 28, as heretofore specified.

I attach to the right-hand faces of the bars S″ and to the faces 41 of the annular ring G″ a series of soft-metal dogs. The dogs 7 are corrugated horizontally, and are dovetailed into the faces 41 of the ring G″ and are driven down, so that their lower ends clear the teeth of the saws. The object of making the dogs of soft metal is in case a saw in cutting into a shingle-block in striking a knot is liable to be sprung upward, when the teeth of the saw would cut the lower ends of the dogs, and being of soft metal the saw is not injured.

The object of the corrugations of the dogs is so that when the sliding heads 28 are shot forward by the action of the springs 31 the dogs 7 will be driven into the ends of the shingle-blocks, thus firmly holding said blocks as the saws cut a shingle from their under faces.

At the left of Fig. 1 and at the right of Fig. 4 I show a detachable or swinging track-section, f′. One end of said track is pivoted to an upright post at 34, upon which said track-section swings. The free end of the section f′, when in the position of Fig. 4, laps against the outer stationary section of track 33. Near the center of the swinging section, at 8, I pivotally attach a draw-bar, d′. The other end of said bar is loosely attached to an upright swinging or reciprocating bar, K, and to the bar K, I attach a swinging bar, d, its inner end being pivoted to the stationary frame H. To the forked upper end of the bar K, I pivot a dog, f, and to the rear end of said dog I pivot an operating-rod, n. Said rod is attached to the bar K and travels with said bar. Its lower end is bent outward, forming a horizontal foot-step, n‴. (See Fig. 1.) e is a collar fixed on said rod, and O is a coiled wire encircling said rod. The spring holds the rod up to its normal position, as shown in Fig. 1.

The lower end of the reciprocating bar K is pivoted to the forked standard S′, which is firmly attached to the base A of the machine. (See Fig. 1.) Attached to the bar K and passing over the pulley n′ is a cord, c‴, with weight W′. Said cord and weight hold the bar K in its normal position, as shown in Figs. 1 and 4, also closing the swinging section of track f′.

The object of the foregoing parts is in cutting the shingles from the lower face of the blocks. As they are reduced the remaining portion of a block may be unfit for shingles on account of a bad heart, or because of rotten material or knots, and to discharge such a block from the machine and not be obliged to saw it up into shingles the operator places his foot upon the step n‴, throwing the dog f up, when its projecting end will engage with one of the lugs x on the periphery of the traveling carriage W, when the bar K will be swung back to the dotted position of Fig. 1, drawing the swinging track-section f′ back to the dotted position of Fig. 4. When the refuse block passing from the saw reaches the opening, it drops through and down the slideway C'. As soon as the block has passed through and the lug $x$ has left the end of the dog $f$ the operator removes his foot from the step $n'''$, when the weight W' will draw the bar K back to the normal position of Fig. 1, also closing or swinging the track $f'$ back to its normal position, as shown in Figs. 1, 2, and 4. The shingle-blocks are dropped onto the stationary tracks by the operator from the table D''', the sliding heads 28 being drawn back as they pass the table D''', to freely receive the shingle-blocks.

Y Y represent two vertical shafts for tilting the tables T T, as will be hereinafter fully set forth. Each shaft is provided with a suitable bearing at the lower end. The upper end portion of each shaft has a horizontal movement in slots $x'$ $x'$, formed in the stationary frame H. (See Figs. 1 and 4.) On the upper end of each shaft I firmly secure a wheel, F''. The periphery of each wheel is provided with lugs $i''$, arranged in pairs, each wheel on its periphery having three intervening or wide spaces, Z', between the sets of lugs $i''$, as clearly shown in Fig. 4. Below each wheel and pivotally secured to the shaft Y is a yoke, 16. (See Fig. 3.) Each yoke has a horizontal rod, E', with a collar and coiled spring, $l$, encircling said rods, and 15 represents two supports attached to the frame H, having their ends 18 bent outward at right angles, through which the rods E' have a longitudinal movement. The springs $l$, pressing against the collars 45, hold the shafts in a vertical position within the slot-openings $x'$. On the inner periphery of the ring G'' is a series of horizontally-projecting lugs, $o''$.

When the annular carriage W is revolving and the wheels F'' are in the position shown in Fig. 4, the lugs $o''$ pass the open spaces Z' of said wheels, as shown at the left of Fig. 4, and when one of the wheels F'', or both of them, is partly turned, (by mechanism hereinafter explained,) one of the lugs $i''$ of said wheels will be struck by one of the lugs $o''$ of the revolving carriage, when the shaft or shafts Y will be revolved, causing the position of the table or tables T to be changed, for the purposes hereinafter fully set forth; and in case the turning of a wheel F'' to bring a lug $i''$ in position to be struck by a lug $o''$ upon the traveling carriage to revolve, the wheel and shaft Y should be so set that the said lugs should strike each other at the ends. The coiled wires $l$ upon the rods E' will yield to the pressure, allowing the shaft Y to be forced back into the slot $x'$ of the frame H, thus preventing the breaking of parts, as would be the case were the shafts Y fixed rigidly at the upper ends.

I firmly secure near the lower end of each shaft Y a cam, $c''$, carrying horizontal pins $a''$ on the periphery of each cam; and 46 is a yoke located below each cam, being pivoted at $o'$, on a collar on each shaft. (The collar is not shown.) Each yoke has two arms, $r$ $r$. On said arms I secure the friction-rings $c$ $c$, which have a bearing upon the angular under face of the cams. I pivotally attach to a right-hand arm of one yoke and to the left-hand arm, $r$, of the other, at 4, a vertical bar, $b$, having horizontal ears carrying set-screws 6 6. The ends of said set-screws engage with the edges of the horizontal portion of the elbow-levers $t'$.

B' B' are brackets having arms L, by which they are firmly secured to the uprights B. (See Figs. 1 and 3.) Said brackets have an inwardly-projecting arm, 47. To said arm I pivot, at 49, the elbow-levers $t'$. At 48 I pivot one end of the horizontal bars $t''$ to the vertical end of the elbow-levers $t'$. The other end of the horizontal bars $t''$ is pivoted at 50 to the lower end of the table-tilting bars $m$, as clearly shown in Figs. 1 and 3. The horizontal end of each elbow-lever $t'$ is pivoted to the forked head 51 of the horizontal rod $r'$. Said rods are provided with a coiled-wire spring $v''$. Said springs press at one end against the forked heads 51; at the other end against the sleeves 5, pivoted to the fixed uprights D'. The rods $r'$ have a slight end movement in the sleeves 5 as the horizontal portion of the elbow-levers is raised and lowered. I attach to the back face of the horizontal arm of the elbow-levers a hasp, 52, (see Fig. 1,) which holds the vertical bars $b$ against said lever-arms.

$i'$ is a brake or friction spring, which I attach to the heads D', the free end pressing upon the upper face of each cam $c''$, as clearly shown in Figs. 1 and 3. Said springs act as brakes, holding the cams and shafts Y when adjusted for tilting the tables T.

J is an elbow-shaped setting-lever, which I pivot to an upright at $e'$, its upper circular end having a handle, $h'''$, for raising and lowering the handled end, whereby the long horizontal end of said lever is moved endwise. To the back of the horizontal portion of this lever I secure two projecting catches, 12 12, so that when the horizontal portion of said lever is moved endwise or longitudinally one of the catches 12 at its free end will strike one of the lugs $a''$ on the cam $c''$, and cause said cam and its shaft Y to be partially rotated. It is this partial rotation of the shafts Y by the operator's lifting or lowering the handle $h'''$ of the lever J that causes the lug $i''$ upon the wheel F'' to be rotated, so that the lugs $o''$ upon the rotating carriage G'' strike the lugs $i''$, causing the shafts Y to revolve, turning the cams $c''$, tilting the arms $r$ of the yokes 46, thereby moving the elbow-levers $t'$, whereby the table-tilting bars $m$ are moved first back and forward, tilting the tables T.

In Fig. 3, $v$ is a weight hung on a cord attached to the center of the horizontal portion of the tilting-lever J. Said cord is located between two bolts secured to the stationary arms 53. This weight is raised, as the horizontal portion of the lever J moves endwise, by pressure upon the handle $h'''$, and when the pressure upon the handle is released the weight $v$ drops, drawing the lever J back to the normal position shown in Figs. 1 and 3, when the catches 12, mounted on said lever, will be freed from the lugs $a''$ on the cams $c''$. While in this position the tilting tables remain in their fixed position.

It will be observed from the foregoing construction of parts that in order to tilt or shift the position of the table T at the right of Fig. 3 the handle $h'''$ of the tilting-lever J is raised to the upper dotted position of said figure, when the catch 12 will partially revolve the cam $c''$, setting a lug $i''$ of the wheel F''', so that a lug $o''$ of the traveling carriage will revolve (when striking the set-lug $i''$) the shaft Y, tilting the table T. The table remains in this position until the next lug $o''$ strikes the other lug $i''$ of the wheel F''', when the shaft Y will be again turned, thus tilting the table T back to its former or normal position; and to tilt the table T at the left of Figs. 2 and 3 the handle $h'''$ of the tilting-lever J is pressed down to dotted lower position of Fig. 3, when said table will be in a like manner operated upon.

It will be observed, on looking at Fig. 3, that the normal position of the tilting tables is such that a shingle-block is creened, so as to cut the butt-end of a shingle from one end of a block, and as it passes to the next saw the butt or thick end of the shingle is cut from the opposite end of said block. By this arrangement the shingles are evenly, or nearly so, cut with the grain of the shingle-blocks; but as the grain changes in many blocks it is often necessary to cut the butt-end of several shingles from the same end of a block in order to get the cutting with the grain of the wood, and it is for this reason I have provided the means for tilting the tables or changing their relative or normal position.

The brackets B', through which the table-tilting bars $m$ swing, are provided with jam-nuts 3 3, which are set to meet the bars $m$. When properly set they act as supports.

The table-tilting-bars $m$ are fulcrumed on a pivot at $v'$ to the horizontal bar A'. Said bars are adjustably attached at their inner ends, as shown at $h$, by means of a bolt working through a slot, 36, in the frame H. (See Figs. 1 and 4.) This allows the moving of the tables to or from the center of the machine, thus maintaining their relative position for the varying lengths of shingle-blocks.

I have stated that the tables are to be located a shingle-thickness below the saws, and to keep them in such a position and to provide for wear of tables and for set or cut of saws I have located at the free ends of the horizontal bars A' a set-screw, 2, so that the tables T may be readily and properly raised or lowered as occasion requires.

As the saws in cutting are sometimes caused to cut upward into a block, whereby a downward strain would be brought upon the annular carriage W, I have located in advance of each saw a fixed shoe or rest, $g'$. (See Fig. 1.) Said shoes are located below the under face of the ring W, and are provided with set-screws $l$, for raising or adjusting said shoes. The shoes prevent the revolving carriage from sagging or being drawn down by means of the upward running of the saws.

The saws in this machine revolve horizontally and both in the same direction, as before stated, while the horizontal rotary carriage which presents the shingle-blocks to the saws revolves in an opposite direction.

By the foregoing arrangement of parts the sawdust from the saws is thrown toward the center of the machine, dropping from both saws at the same point, whereby I am able, by means of a single spout or the ordinary dust-conveyer, to remove the dust from the machine at a slight expense.

The rotary carriage traveling toward the saws is not liable to be drawn around by the cutting of the saws into the shingle-blocks, as is the case in my former invention cited, where the rotary carriage and saws travel in the same direction; and in said invention the sawdust from the saws is thrown outward, thus depositing it in two places.

Having thus fully set forth my invention, what I claim as new, and desire to secure by Letters Patent, is—

1. In a shingle-machine, the combination of a series of circular saws traveling horizontally and in the same direction, the rotary carriage for presenting the shingle-blocks to said saws, said rotating carriage adapted to travel over said saws and to revolve horizontally in an opposite direction to that traveled by the saws, as and for the purposes specified.

2. In a shingle-machine, the combination of a series of horizontally-rotating circular saws traveling in the same direction, a horizontal rotating carriage adapted to travel over said saws and in an opposite direction, and the series of friction-shoes $g'$, located adjustably below the outer periphery of the rotating carriage, as and for the purposes set forth.

3. In a shingle-machine, and in combination, the circular saws traveling in the same direction, the rotating carriage traveling in an opposite direction to said saws, said carriage being provided with a series of shingle-block compartments, the soft-metal corrugated dogs, the series of sliding heads working in end slides and having central slides, 29, the series of levers pivoted to the periphery of the carriage, one end of each lever engaging with a sliding head, the other carrying a friction-wheel, the rod and spring for operating each lever, the stationary tracks R, the tilting tables located in advance of each saw, and a shingle thickness below said saws, and the circular tracks located below the carriage and between the saws and said tilting tables, as and for the purposes set forth.

4. In a shingle-machine, the combination of a series of circular saws, a rotating carriage having shingle-block compartments adapted to travel over said saws, and mechanism for automatically grasping and releasing said shingle-blocks, a table located in advance of each saw, and circular tracks leading from said saws to said tables, a section of said track adapted to be swung outward or disconnected for the purpose of discharging a shingle-block from the machine, substantially as specified.

5. In a shingle-machine, and in combination, a circular saw, a traveling carriage adapted to travel over said saw, said carriage being provided with a shingle-block compartment, and a track located below the carriage and having a section adapted to be disconnected or swung outward for the purpose of discharging a shingle-block from the machine while in motion, substantially as and for the purposes specified.

6. In a shingle-machine, the combination of the uprights B, the stationary frame mounted on said uprights, the annular carriage, the spider and shaft for supporting said carriage, the mechanism for driving said carriage, the series of shingle-block compartments, the mechanism for grasping and releasing said shingle-blocks, the tilting tables located in advance of said saws, the circular tracks leading from said saws to said tilting tables, the track-section $f'$ being pivoted or hinged at one end, the rod $d'$, pivoted to said section, said rod being attached to the reciprocating bar K, said bar at its upper end being provided with a dog, $f$, and mechanism for raising and lowering said dog, the series of lugs $x$, mounted on the periphery of the carriage, said lugs adapted to engage with the dog $f$ when in a vertical position, whereby the track $f'$ is caused to swing outward, and the cord and weight W', for bringing said track-section back to its normal position, for the purposes specified.

7. In a shingle-machine, and in combination, the rotating carriage having a series of lugs, $x$, on its outer periphery, the reciprocating bar K, pivoted at its lower end and carrying a dog pivotally at its upper end, the rod $n$, pivoted to said dog and having the spring-holding device and step $n'''$, the track-section $f'$, the rod $d'$, having one end attached to the bar K, the other to the swinging track-section $f'$, and the rod $d$, having one end attached to the bar K, the other to the frame H, for the purposes set forth.

8. In a shingle-machine, the combination of the saws, the revolving carriage, the tilting tables located in advance of said saws, said tables being provided with depending or tilting arms, said tilting arms being pivotally fulcrumed upon the horizontal arms A', the inner ends of said arms A' being adjustably attached to the stationary frame H by the bolts working in slots 36, the outer or free ends being provided with vertical adjustments for raising and lowering said tables, for the purposes set forth.

9. In a shingle-machine, the combination of the stationary frame H, mounted on suitable supports, the revolving carriage located over said frame and having a series of horizontally-projecting lugs, $o''$, on the inner periphery of said carriage, the table-operating shafts Y Y, the wheels mounted on the upper ends of said shafts, said wheels having on their periphery the lugs $i''$ and spaces $Z'$, the yokes 16, pivoted to said shafts, carrying the rod E' and coiled springs $l$, the tables T, and mechanism for tilting said tables, as and for the purposes specified.

10. In a shingle-machine, the combination of the stationary frame, the rotating carriage, the circular saws, the circular tracks located below said carriage, the tilting tables located in advance of the saws and having the depending arms $m$, said tables being fulcrumed on adjustable supports, the shafts Y Y, each carrying a wheel, F'', said wheels adapted to engage with the lugs $o''$ of the rotating carriage, as specified, the cams located on the lower ends of said shafts, each cam having a friction-brake, $i'$, and a tilting yoke with arms carrying friction-bearings operating against the cams, the vertical levers pivoted to the arms $r$, and intermediate parts coupling to the lower ends of the table-tilting arms $m$, as and for the purposes specified.

11. In a shingle-machine, the hand-setting device for tilting the tables, consisting of the hand-lever J, pivoted at $e'$ to an upright of the machine and carrying the catches 12, in combination with the lugs $a''$, the cams $c''$, the shafts Y, the wheels F'', having lugs $i''$, adapted to engage with the lugs $o''$ of the carriage, and weight and cord for bringing said hand-lever back to its normal position, as and for the purposes set forth.

12. In a shingle-machine, the combination of the saws, the rotating carriage, the tilting tables pivotally mounted on adjustable supports and having depending arms, the vertical shafts Y Y, each carrying a wheel at the upper end, said wheels adapted to be revolved by the lugs $o''$ on the rotating carriage, the cams mounted on said shafts, the tilting yokes pivotally mounted on said shafts below the cams and having arms carrying friction-bearings adapted to be operated upon by the turning of said cams, the vertical bars pivoted to the arms $r$ and carrying set-screws 6 6, operating on the horizontal arms of the elbow-levers $t'$, said levers being pivoted at 49 to the brackets B', the connecting-bars $t''$, attached at one end to the elbow-levers and at the other end to the table-arms $m$, the rods attached to the horizontal ends of the elbow-levers and having one end loosely fitted to the pivoted thimbles 5, and coiled springs, for holding the elbow-levers $t'$ when shifted, and hand mechanism for partially rotating said cams; substantially as specified.

In testimony whereof I affix my signature in presence of two witnesses.

PATRICK O'CONNOR.

Witnesses:
 GEO. OFFICER,
 M. L. STOUTENBURG.